United States Patent Office 3,320,736
Patented May 23, 1967

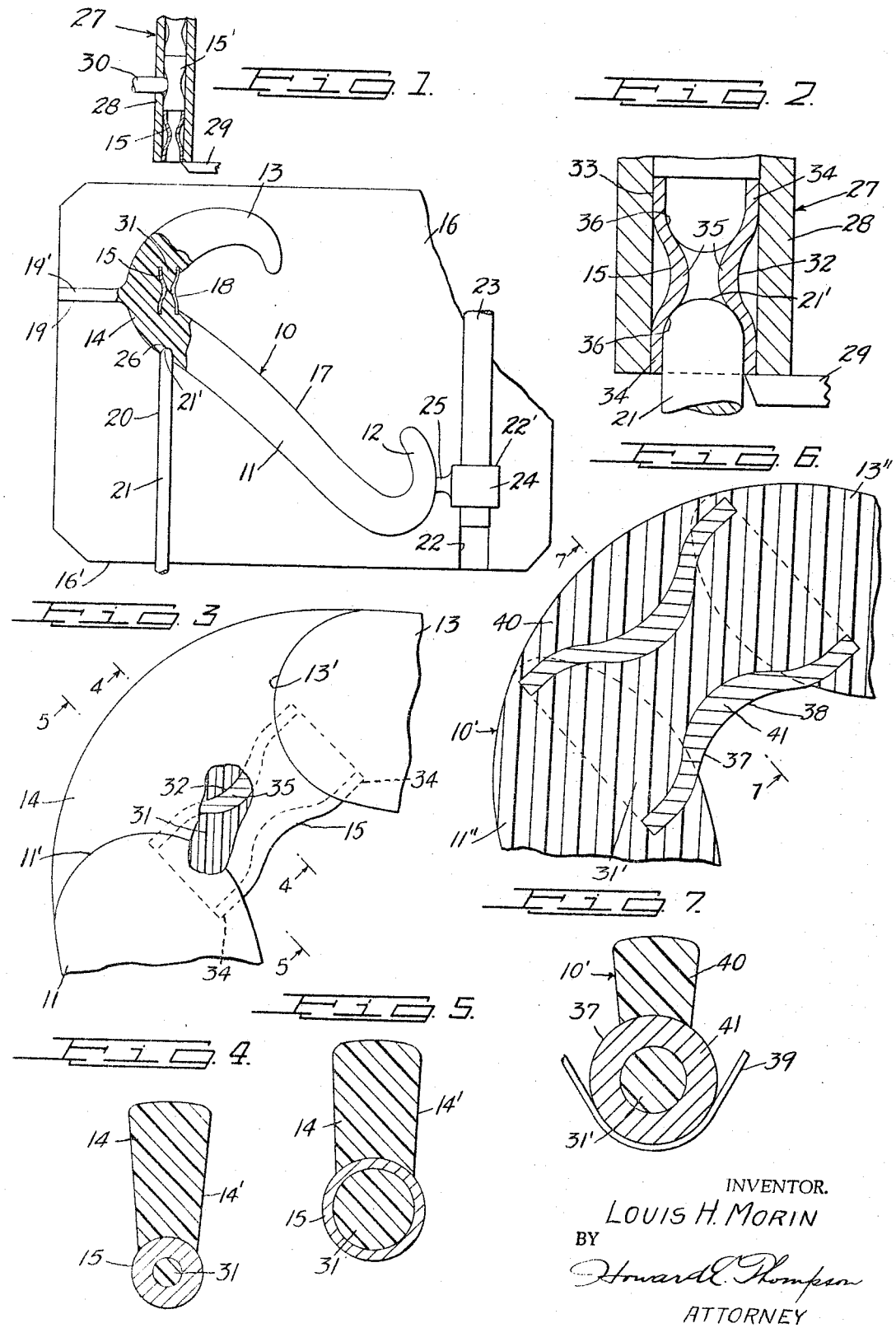

3,320,736
TRAVELER WITH WEAR RESISTANT INSERT
Louis H. Morin, Bronx, N.Y., assignor to Coats & Clark Inc., New York, N.Y., a corporation of Delaware
Filed June 30, 1964, Ser. No. 379,271
2 Claims. (Cl. 57—125)

This invention relates to travelers formed of molded plastic material incorporating therein a wear resistant insert, the latter being preferably of a generally hourglass cross-sectional contour to provide a circumferentially long surface engaged by the thread in the use of the traveler. More particularly, the invention deals with an insert structure having a relatively thick wall centrally thereof to provide extended life use of the traveler.

Still more particularly, the invention deals with the method of producing travelers of the type and kind defined.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic view showing the surface of one die with a molded traveler including the insert as formed between the dies, as well as illustrating, in part, the insert delivery station, with parts of the construction broken away and in section.

FIG. 2 is an enlarged detail view of the discharge end of the delivery station showing the transfer core in position preparatory to delivery of an insert to the cavity portion of the dies.

FIG. 3 is an enlarged side view of a part of the traveler shown in FIG. 1, with parts of the construction broken away and in section.

FIG. 4 is a section on the line 4—4 of FIG. 3, omitting background showing.

FIG. 5 is a view similar to FIG. 4 taken on the line 5—5 of FIG. 3.

FIG. 6 is a view similar to FIG. 3, showing a modified form of insert; and

FIG. 7 is a section on the line 7—7 of FIG. 6, omitting background showing and illustrating diagrammatically the position of a thread operating upon the insert.

In illustrating one adaptation and use of my invention, I have shown in FIG. 1 of the drawing a molded plastic insert 10, having a shank portion 11, with a small hook 12 at one end and a larger hook 13 at the opposed end joining the shank in a rounded portion 14, in which an insert 15 is positioned in the molding operation of the travelers, as more fully hereinafter described.

In FIG. 1 of the drawing, 16 represents the face view of one of the dies of a molding machine, including a cavity 17 forming the general contour of the traveler, as briefly described above, as well as a cavity portion 18, conforming to at least part of the insert 15. At 19 is shown a sprue or gate for admission of the plastic material into the cavity of the die. At 20 is shown a cavity portion, in which a transfer pin or rod 21 is positioned during the molding operation. Another cavity 22 is provided, in which another transfer pin or rod 23 is arranged, the cavity 22 being enlarged, as seen at 22', to form around the pin 23 a collar portion 24 formed integral with the small hook 12, as seen at 25.

From the foregoing, it will be apparent that, after the traveler has been molded, as diagrammatically illustrated in FIG. 1, the pins 21 and 23 are moved to deliver the formed traveler to a trimming station beyond the lower surface 16' of the die 16 where the collar 24 is trimmed from the hook 12 and the sprue 19' is trimmed from the rounded portion 14 of the traveler and the transfer rod 21 is removed from the recessed portion 26 of the traveler, in which the end of the rod 21 is positioned during the molding operation.

Upon completion of the above operation, the transfer rod 21 is then moved into the insert delivery station 27. This station comprises an elongated insert delivery tube 28, into which the inserts 15 are suitably delivered and abut end to end, as illustrated, in part, in FIG. 1 of the drawing. The engagement of the rod 21 with the lowermost insert 15 is illustrated in FIG. 2 on an enlarged scale. It will appear that the station 27 includes an intermittently operating sliding shutter 29, which engages and retains the lowermost insert 15 in the position shown in FIGS. 1 and 2, preparatory to being picked up by the rod 21, as shown in FIG. 2. The station 27 also includes a locking indent or retaining member 30 movable inwardly and outwardly with respect to the tube 28, so as to hold the next adjacent insert, as at 15' FIG. 1, in position as and when the lowermost insert 15 is picked up and transferred to proper position between the dies, one of which is shown at 16 in FIG. 1. Upon completion of this operation, the shutter 29, which has naturally been withdrawn to release the lower insert 15, is returned to operative position and, then, the member 30 is moved outwardly to allow the inserts to drop in the tube, which would bring the next lowermost insert 15' into the delivery position, such as the showing of the insert 15 in FIGS. 1 and 2 of the drawing.

From the foregoing, it will be apparent that the rod 21 moves from its raised position, illustrated, in part, in FIG. 2, first, to a position positioning the insert 15 properly in the die 16 for registration with the cavity 18; whereupon, the two dies of the molding station, represented by the one die 16 shown, are partially closed to retain the insert 15 in the position noted in FIG. 1; whereupon, the rod 21 moves downwardly to the position illustrated in full lines in FIG. 1. The dies then are fully closed and the rod 23 will be in the position shown in FIG. 1. Thus, in the injection of the plastic material into the dies, the traveler shown in FIG. 1 will be formed around the insert 15, with part of the material of the traveler positioned in the hourglass contour of the traveler, as diagrammatically seen at 31 in FIG. 1 and also illustrated, in part, at 31 in FIG. 3 of the drawing.

Considering FIG. 3 of the drawing, together with the sectional views of FIGS. 4 and 5, it will appear that the central part of the rounded portion 14 is of thinner wall structure than the adjacent rounded portion 13' of the hook 13 and the adjacent rounded portion 11' of the shank 11, as illustrated by the inwardly contracted wall 14' shown in FIGS. 4 and 5 of the drawings. This leaves the peripheral surface of the insert 15 exposed throughout the major portion of its circumference, allowing for free passage of the thread operating upon the wear resistant insert. This will be apparent from the showing, for example, in FIG. 7 of the drawing, as later described. At the same time, the walls 14' will form a decided backing of the insert, in addition to the molded material of the traveler arranged within the insert, again, as seen at 31 in FIGS. 4 and 5 of the drawing.

The tubular wear resistant insert, as shown in FIGS. 1 to 5, inclusive, is generally of hourglass cross-sectional form. In other words, the insert has, centrally thereof, note FIG. 2, an annular rounded recess portion 32 at the periphery thereof considerably less in diameter than the outside diameter 33 of the tubular ends 34 of the insert. An insert of the type and kind disclosed can be formed from a tube substantially of the diameter of the ends 34 and, in forming the central recess portion 32, the tube is longitudinally compressed, which results in compacting of the material of the metallic tube to form the thicker wall structure 35 in back of the recess 32, which results in providing a wear resistant insert having a greater wear property than the normal thickness of the tube, as diagrammatically represented by the ends 34. This formation also produces rounded sockets 36 at ends of the insert which will conform to the contour of the rounded end 21' of the transfer rod 21, as clearly illustrated in FIG. 2. It will, thus, be apparent that, when the rod 21 is raised to the position of FIG. 2 and the lower insert 15 at the station 27 is released by outward movement of the shutter 29, the rod provides means for delivering the insert to the position, as shown between the dies and in registration with the cavity portion 18 in FIG. 1 of the drawing. It is here pointed out that this cavity portion fits around that part of the insert at opposed sides of the walls 14', as noted in FIGS. 4 and 5 of the drawing, in the support of the insert in position in the dies as and when the rod 21 is moved to the position shown in FIG. 1 of the drawing, in other words, the position upon which the molded traveler is partially formed upon the rounded end 21' of the rod 21, which will leave in the resulting traveler the slight recess 26 as and when the molded traveler has been trimmed and stripped from the rod 21 at the trimming and stripper station. This station is not shown, as it is well-known in this art and, in this stripping operation, it will be understood that the collar 24 is stripped from the transfer rod 23 as and when this rod is raised to its operative position for reception of the next successive molded traveler. The rod 23 will have two movements, one from the position of FIG. 1 to the trimming and stripper station below 16'; whereas, the rod 21 assumes four different positions, namely the position shown in FIG. 2, the position locating the insert in the die and in registration with the cavity portion 18 engaging the insert, then the position of the rod 21 shown in FIG. 1 and, finally, the lowered position, guiding the molded traveler to the trimming and stripper station.

In FIGS. 6 and 7 of the drawing, I have shown a slight modification, wherein in insert 37, generally of the structural characteristics of the insert 15, is employed, but of larger diameter, in other words, formed from a tube larger in diameter than the tube employed in formation of the insert 15, so as to provide a larger diameter to the central recessed portion 38 of the insert, in other words, larger than the recess portion 32 of FIG. 2 of the drawing. This results in providing a much greater spacing of the diameter of the recess portion 38 to more widely spread the thread illustrated, in part, at 39 in FIG. 7 with respect to the wall 40 which is otherwise generally similar to the wall 14', as illustrated in FIGS. 4 and 5 of the drawing. The insert 37 also has the thicker wall structure, as seen at 41, providing the greater wear factor of the portion of the insert engaged by the thread, in other words, similar to the thickened wall, as at 35 in FIG. 2 of the drawing.

Considering FIG. 7 of the drawing, it will appear that the plastic material of the traveler 10', shown in FIGS. 6 and 7, extends into the bore of the insert 37, as seen at 31', which reinforces and provides a definite backing for the insert and further provides a secure coupling between the hook end portion, shown, in part, at 13" and the shank portion 11", in FIG. 6 of the drawing. In this connection, it will further be apparent that the metallic insert, in itself, reinforces the coupling between 11" and 13" and this is also true with the structure shown in FIGS. 1 to 5, inclusive.

For purposes of description, the hook end 13, 13" may be said to be the hook-shaped part and the shank 11, 11" may be said to be a shank part, these parts being joined and spaced in a thin wall part. Also the molded material arranged in the bore of the tubular insert actually forms a bridging member joining the hook and shank parts. Considering FIGS. 4 and 7, it will be apparent that the smallest outside diameter of the insert is greater in dimensions than the portion of the thin wall part abutting that part of the insert. It is also important to note that, in both forms of construction shown, the terminal ends of the insert are completely enveloped by the material of the traveler.

Having fully described my invention, what I claim as new and desire to secure by Letters Patent is:

1. A molded plastic traveler having a hook part and a shank part, said parts being joined in a thin wall rounded part, a tubular metallic insert arranged in adjacent ends of the hook part and shank part and upon the inner surface of said thin wall part, said tubular insert having a reduced diameter rounded central portion, the greater part of the circumference of which is exposed between adjacent ends of the hook part and the shank part and the inner surface of said thin wall part, the molded material of said traveler being arranged in and filling the bore of the insert forming thereof a member bridging the hook part and shank part and the smallest diameter of said insert is greater than the width of the adjacent portion of said thin wall part of the traveler.

2. A traveler as defined in claim 1, wherein the central portion of said insert is of thicker wall structure than ends of the insert disposed in said hook part and shank part.

References Cited by the Examiner
UNITED STATES PATENTS

| 2,683,346 | 7/1954 | Pieper | 57—125 |
| 2,961,826 | 11/1960 | Morin | 57—125 |
| 2,966,026 | 12/1960 | Morin | 57—125 |

FRANK J. COHEN, *Primary Examiner.*

STANLEY N. GILREATH, J. PETRAKES,
*Assistant Examiners.*